(12) United States Patent
Jessen et al.

(10) Patent No.: US 10,545,509 B1
(45) Date of Patent: Jan. 28, 2020

(54) MODULAR VEHICLES WITH DETACHABLE PODS

(71) Applicant: X Development LLC, Mountain View, CA (US)

(72) Inventors: Johan Ulrich Lewin Jessen, Mountain View, CA (US); Kristina Liv Larsen, San Francisco, CA (US); Martin Friedrich Schubert, Mountain View, CA (US); Michael Patrick Bauerly, Sunnyvale, CA (US); Michael Jason Grundmann, San Jose, CA (US); Rowan M. Ogden, Piedmont, CA (US); Phillip Edwin Watson, Santa Cruz, CA (US)

(73) Assignee: X Development LLC, Mountain View, CA (US)

( * ) Notice: Subject to any disclaimer, the term of this patent is extended or adjusted under 35 U.S.C. 154(b) by 117 days.

(21) Appl. No.: 15/796,576

(22) Filed: Oct. 27, 2017

Related U.S. Application Data

(60) Provisional application No. 62/413,786, filed on Oct. 27, 2016.

(51) Int. Cl.
*G06D 1/00* (2006.01)
*B62D 31/00* (2006.01)
(Continued)

(52) U.S. Cl.
CPC ......... *G05D 1/0291* (2013.01); *B62D 31/003* (2013.01); *G05D 1/0088* (2013.01); *G05D 2201/0212* (2013.01)

(58) Field of Classification Search
CPC ...... G05D 1/00; G05D 1/0291; G05D 1/0088; G05D 2201/0212; B62D 31/00;
(Continued)

(56) References Cited

U.S. PATENT DOCUMENTS

| 3,881,767 A | 5/1975 | Klees |
| 3,930,680 A | 1/1976 | Littlefield |

(Continued)

FOREIGN PATENT DOCUMENTS

| CN | 105882588 A | 8/2016 |
| DE | 10224065 A1 | 12/2003 |
| KR | 101461529 B1 | 11/2014 |

*Primary Examiner* — Yonel Beaulieu
(74) *Attorney, Agent, or Firm* — Fish & Richardson P.C.

(57) ABSTRACT

The subject matter of this specification generally relates to modular vehicles including separable pod and base units. In some implementations, a computing system installed in a vehicle base identifies a vehicle pod that is detachably connected to a chassis on the vehicle base. In response to identifying that the vehicle pod is detachably connected to the chassis on the vehicle base, a communications link can be established between the computing system installed in the vehicle base and a computing system installed in the vehicle pod. Based on information obtained through the communications link, the computing system installed in the vehicle base can determine a particular configuration of the vehicle pod that is detachably connected to the chassis. The computing system can then verify that the vehicle base can safely transport the vehicle pod while the vehicle pod is detachably connected.

19 Claims, 6 Drawing Sheets

(51) Int. Cl.
  *G05D 1/02* (2006.01)
  *G05D 1/00* (2006.01)
(58) Field of Classification Search
  CPC ...... B62D 31/003; B62D 59/00; B62D 59/04;
    B62D 63/00; B62D 53/00; B62D 53/068;
    B60Y 2200/16
  See application file for complete search history.

(56) References Cited

U.S. PATENT DOCUMENTS

| | | | | |
|---|---|---|---|---|
| 4,053,073 A * | 10/1977 | Franchin | ............... | B60P 1/6427 254/45 |
| 4,232,755 A | 11/1980 | Dow | | |
| 4,897,642 A * | 1/1990 | DiLullo | ............... | B60R 25/102 235/385 |
| 5,051,046 A * | 9/1991 | Oren | ............... | B60P 3/08 410/26 |
| 5,397,924 A * | 3/1995 | Gee | ............... | B60D 1/62 280/422 |
| 5,417,540 A * | 5/1995 | Cox | ............... | B60P 1/6427 414/495 |
| 5,937,924 A * | 8/1999 | Cooper | ............... | B25H 1/005 108/143 |
| 6,019,416 A | 2/2000 | Beierl | | |
| 6,354,777 B1 * | 3/2002 | Riekki | ............... | B60P 3/122 410/12 |
| 6,536,831 B2 | 3/2003 | Rothe et al. | | |
| 8,079,628 B2 * | 12/2011 | Micheli | ............... | B60P 3/423 296/57.1 |
| 9,030,321 B2 * | 5/2015 | Breed | ............... | B60T 1/005 340/539.17 |
| 9,940,840 B1 * | 4/2018 | Schubert | ............... | G08G 1/22 |
| 2012/0191272 A1 * | 7/2012 | Andersen | ............... | G06Q 10/087 701/2 |
| 2012/0239261 A1 * | 9/2012 | Medwin | ............... | B66F 9/0755 701/50 |
| 2013/0033381 A1 * | 2/2013 | Breed | ............... | B60T 1/005 340/568.1 |
| 2014/0025245 A1 * | 1/2014 | Fanourakis | ............... | B60W 20/15 701/22 |
| 2017/0355295 A1 * | 12/2017 | Gutowitz | ............... | B60P 3/07 |

* cited by examiner

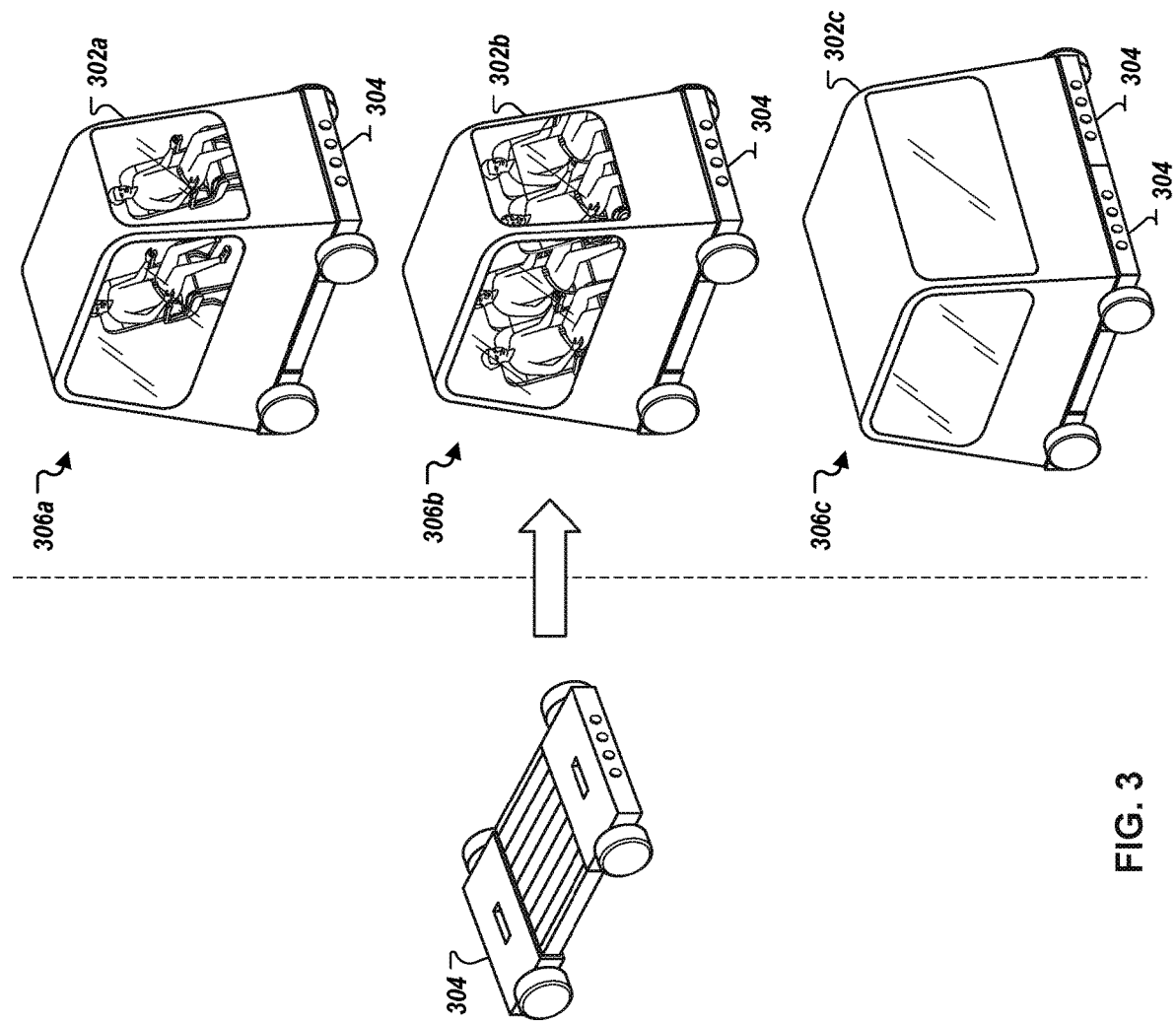
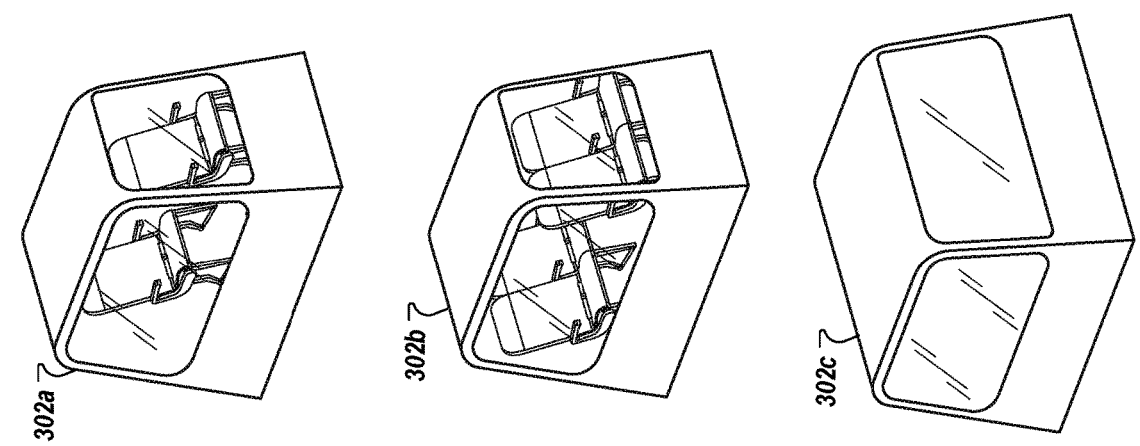
FIG. 3

500

```
┌─────────────────────────────────────────────────────────┐
│ Identify, by a computing system installed in a vehicle  │
│ base, that a vehicle pod is detachably connected, or is │
│ about to be detachably connected, to the vehicle base.  │
│                                                     502 │
└─────────────────────────────────────────────────────────┘
                            │
                            ▼
┌─────────────────────────────────────────────────────────┐
│ Establish communications link between computing system  │
│ installed in the vehicle base and a second computing    │
│ system installed in the vehicle pod                     │
│                                                     504 │
└─────────────────────────────────────────────────────────┘
                            │
                            ▼
┌─────────────────────────────────────────────────────────┐
│ Determine a particular configuration of the vehicle pod │
│ that is detachably connected, or is about to be         │
│ detachably connected, to the vehicle base               │
│                                                     506 │
└─────────────────────────────────────────────────────────┘
                            │
                            ▼
┌─────────────────────────────────────────────────────────┐
│ Verify that the vehicle base can safely transport the   │
│ vehicle pod while the vehicle pod is detachably         │
│ connected to the chassis on the vehicle base            │
│                                                     508 │
└─────────────────────────────────────────────────────────┘
```

FIG. 5

MODULAR VEHICLES WITH DETACHABLE PODS

CROSS-REFERENCE TO RELATED APPLICATIONS

This application claims priority to U.S. Application Ser. No. 62/413,786, filed on Oct. 27, 2016, the entire contents of which are hereby incorporated by reference.

TECHNICAL FIELD

This disclosure generally relates to automotive vehicles, and more particularly to modular vehicles that include separable pod units and base units for, e.g., carrying passengers and powering the vehicles, respectively.

BACKGROUND

Population growth in and around urban centers has, in many instances, strained the capacity of transportation infrastructure in these areas. Construction of new infrastructure and maintenance of existing infrastructure can be expensive and slow. As a result, existing infrastructure in some areas is sometimes unable to adequately meet the transportation demands of communities in these areas. With respect to roadways, one result of insufficient capacity is frequent, and often frustrating, traffic congestion. Autonomous vehicles, which use sensed information about their surroundings to drive without human input, have been developed as one transportation option for existing roadways.

SUMMARY

This specification describes systems, methods, devices, and other techniques for controlling and operating modular street vehicles. In general, a modular street vehicle can include a base unit and a pod unit that detachably connects to the base unit. Because pod and base units are separable, each can be put to different uses at different times, and different combinations of base units and pod units can be assembled to create various permutations of modular vehicles. The base unit can include an engine or motor, a drivetrain, and other such equipment that carries out driving operations including driving, steering, and braking. The base unit may be relatively flat and low to the ground, but may lack a space for passengers or cargo. Pod units, in contrast, may include an enclosure that defines a human-occupiable space (e.g., a vehicle cabin complete with seats, safety equipment, environmental controls, and multimedia or other entertainment options), but that lacks an engine, motor, or other equipment that would be required to drive the pod unit independent of the base unit. When a pod unit is connected to a base unit, the resulting vehicle assembly can provide a fully functional vehicle that combines beneficial aspects of both the pod unit and the base unit, which may be optimized for the parameters of a particular trip.

Some implementations of the subject matter described herein include a vehicle base for transporting a detachable vehicle pod. The vehicle base can include an engine or motor, a drivetrain, a chassis, one or more sensing components, and a pod-interface computing system. The drivetrain is configured to deliver power from the engine or the motor to at least one wheel coupled to the vehicle base. The chassis is configured to support the vehicle pod and enable a detachable connection of the vehicle pod to the vehicle base. The sensing components are configured to generate at least one signal representing a presence of the vehicle pod on the chassis of the vehicle base. The pod-interface computing system can include one or more processors and can be configured to (i) monitor the at least one signal to determine that the vehicle pod is currently connected to the vehicle base and (ii) in response to determining that the vehicle pod is currently connected to the vehicle base, exchange messages with the vehicle pod to identify a particular configuration of the vehicle pod.

These and other implementations can optionally include one or more of the following features.

The vehicle base can further include an autonomous navigation computing system. The autonomous navigation computing system is configured to generate control signals that cause the vehicle base to autonomously navigate to a specified destination. The vehicle base can be configured to autonomously navigate with the vehicle pod connected to the vehicle base. The vehicle base can also be configured to autonomously navigate without the vehicle pod connected to the vehicle base. In some implementations, the vehicle base can exclude a human-occupiable space.

The chassis can include a platform having a complementary shape to an underside of the vehicle pod, so as to allow the platform to engage and support the vehicle pod when the vehicle pod is connected to the vehicle base. The chassis can further include one or more locks that secure the vehicle pod on the platform when the vehicle pod is connected to the vehicle base.

The chassis can be configured to enable detachable connection of differently-sized vehicle pods to the vehicle base.

The one or more sensing components can include at least one of (i) a load sensor arranged to generate a load signal that represents a load supported by the chassis or (ii) a lock sensor arranged to generate a lock signal that represents whether a lock is in a locked state, the lock configured to secure the vehicle pod to the vehicle base. The pod-interface computing system can be configured to determine whether the vehicle pod is currently connected to the vehicle base based on at least one of (i) identifying that the load supported by the chassis, as indicated by the load signal, matches a load profile of the vehicle pod or (ii) identifying that the lock is in the locked state, as indicated by the lock signal.

The pod-interface computing system can be further configured to (i) identify, based on the messages exchanged with the vehicle pod, that the vehicle pod connected to the vehicle base has a particular configuration among a plurality of configurations of vehicle pods that are connectable to the vehicle base and (ii) verify that the at least one signal representing the presence of the vehicle pod on the chassis of the vehicle base is consistent with the vehicle pod having the particular configuration.

The pod-interface computing system can be configured, in response to identifying the particular configuration of the vehicle pod, to adjust a set of operational parameters of the vehicle base to enable the vehicle base to interoperate with the vehicle pod having the particular configuration.

The pod-interface computing system can be further configured to verify that the connection of the vehicle pod to the vehicle base meets a set of operational criteria, including evaluating the at least one signal from the one or more sensing components with respect to the set of operational criteria. In response determining that the connection of the vehicle pod to the vehicle base does not meet the set of operational criteria, the pod-interface computing system can disable an autonomous navigation capability of the vehicle base.

Some implementations of the subject matter described herein include a human-occupiable street vehicle. The vehicle can include a vehicle base and a vehicle pod. The vehicle pod can detachably connect to the vehicle base and can include an enclosure (e.g., housing) that defines a human-occupiable space.

Some implementations of the subject matter described herein include a computer-implemented method. The method can include identifying, by a computing system installed in a vehicle base, that a vehicle pod is detachably connected, or is about to be detachably connected, to a chassis on the vehicle base. The vehicle base can include a motor or engine configured to propel the vehicle base while the vehicle pod is connected to the chassis on the vehicle base. In response to identifying that the vehicle pod is detachably connected, or is about to be detachably connected, to the chassis on the vehicle base, a communications link can be established between the computing system installed in the vehicle base and a computing system installed in the vehicle pod. Based on information obtained through the communications link, the computing system installed in the vehicle base can determine a particular configuration of the vehicle pod that is detachably connected, or is about to be detachably connected, to the chassis on the vehicle base. The computing system installed in the vehicle base can verify that the vehicle base can safely transport the vehicle pod while the vehicle pod is detachably connected to the chassis on the vehicle base.

These and other implementations can optionally include one or more of the following features.

The vehicle pod can include a housing that defines a human-occupiable space. The vehicle base may not be configured to be human-occupiable. The vehicle base can be configured to autonomously navigate without the vehicle pod being detachably connected to the vehicle base.

The computing system installed in the vehicle base can identify a set of vehicle pod parameters that correspond to the particular configuration of the vehicle pod that is detachably connected, or is about to be detachably connected, to the chassis on the vehicle base. The computing system installed in the vehicle base can adjust, based on the identified set of vehicle pod parameters that correspond to the particular configuration of the vehicle pod, a set of vehicle base parameters that define operational characteristics of the vehicle base.

The set of vehicle pod parameters can include at least one of a size of the vehicle pod or a power rating of the vehicle pod. Adjusting the set of vehicle base parameters can include, respectively at least one of adjusting a size of the chassis to match the size of the vehicle pod or configuring a power supply on the vehicle base to deliver power to the vehicle pod according to the power rating.

Verifying that the vehicle base can safely transport the vehicle pod while the vehicle pod is detachably connected to the chassis on the vehicle base can include determining whether the detachable connection of the vehicle pod to the chassis on the vehicle base meets a set of operational criteria, including evaluating at least one signal from the one or more sensing components on the vehicle base with respect to the set of operational criteria. In response determining that the detachable connection of the vehicle pod to the chassis on the vehicle base does not meet the set of operational criteria, disabling an autonomous navigation capability of the vehicle base.

Some implementations of the subject matter described herein include a first computing system that is configured to be installed in a vehicle base that includes a motor or engine configured to propel the vehicle base while a vehicle pod is detachably connected to the vehicle base. The computing system can include one or more processors and one or more computer-readable media having instructions stored thereon that, when executed by the one or more processors, cause the one or more processors to perform operations. The operations can include identifying, by the first computing system, that the vehicle pod is detachably connected, or is about to be detachably connected, to a chassis on the vehicle base; in response to identifying that the vehicle pod is detachably connected, or is about to be detachably connected, to the chassis on the vehicle base, establishing a communications link between the first computing system and a second computing system installed in the vehicle pod; determining, by the first computing system based on information obtained through the communications link, a particular configuration of the vehicle pod that is detachably connected, or is about to be detachably connected, to the chassis on the vehicle base; and verifying, by the first computing system, that the vehicle base can safely transport the vehicle pod while the vehicle pod is detachably connected to the chassis on the vehicle base.

Various features and advantages of the foregoing subject matter is described below with respect to the figures. Additional features and advantages are apparent from the subject matter described herein and the claims.

DESCRIPTION OF DRAWINGS

FIG. 3 diagrams various modular street vehicles that can be formed from different combinations of pod and base units.

FIG. 5 depicts a flowchart of an example process for identifying and validating a proper connection between a pod unit and a base unit in an assembled, modular vehicle.

DETAILED DESCRIPTION

In general, this disclosure describes systems, methods, devices, and other techniques for managing and operating modular street vehicles. The modular vehicles discussed herein each includes a base unit and a pod unit that is readily separable from the base. The base and pod of a vehicle can each include respective components that collectively provide complete functionality for an assembled vehicle to perform various tasks such as navigating and transporting humans and other cargo. For example, a base unit may include the core components for powering the vehicle (e.g., drivetrain, fuel or battery, motor or engine) and a navigational computing system, while the pod unit provides a cabin to accommodate passengers and cargo. In some implementations, the separable configuration of the vehicle into respective base-pod units facilitates efficient use of transportation infrastructure and automotive resources. For instance, a fleet of modular vehicles may be controlled by a central computing system to optimize vehicle routing, respond to traffic conditions, efficiently transport passengers to requested destinations, meet current and forecasted transportation demands, reduce vehicle idling times, or a combination of these and other performance objectives. These and other aspects are discussed in further detail with respect to the figures.

Figure 1:
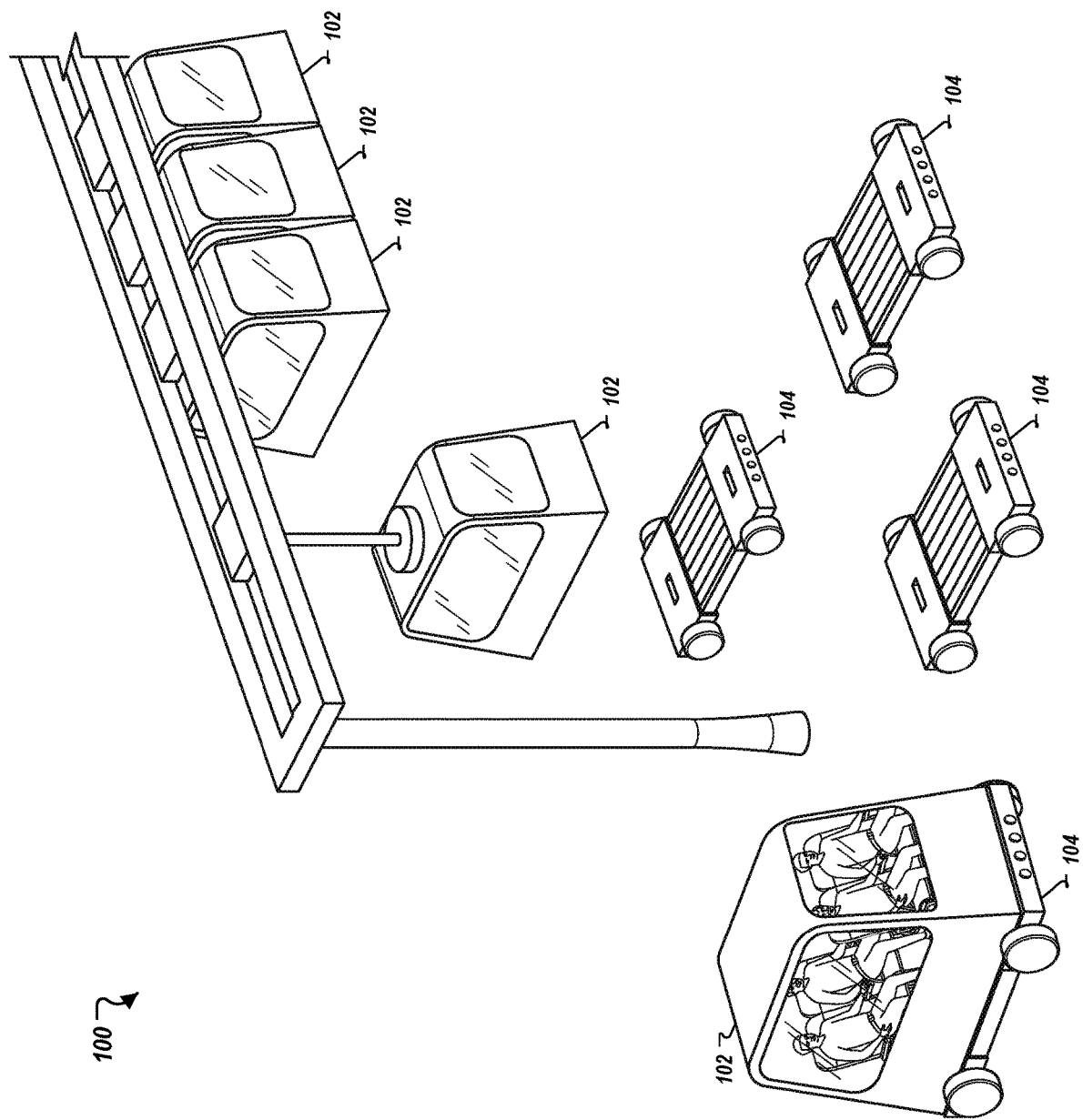
FIG. 1 diagrams an example set of modular vehicles located at an exchange station for an elevated rail network.

Referring to FIG. 1, a diagram is shown of an example set of modular vehicles at an exchange station 100. Generally, the vehicles discussed herein are referred to as "modular" due at least in part to the interchangeability of pod units with bases. Different pods can be removably secured to base units to form complete vehicles, and pods can later be separated from the base units at particular times. As such, bases may be configured to carry different pod units and pod units may be switched among base units and other transportation modalities, e.g., according to instructions from a central computing system that manages operation of a fleet of modular vehicles in one or more areas.

In the scenario of FIG. 1, a collection of base units 102 and pod units 104 are depicted as being located at an exchange station 100. An exchange station 100 is generally a designated location within a geographic area (region) in which base units 102 and pod units 104 can be safely connected to each other, and in which complete vehicle units can be safely separated into their constituent components. The exchange station 100 also acts as a switching point in a transportation system, e.g., a location where pods are re-directed to different transportation modalities, new combinations of vehicle units are formed, passengers and cargo are loaded into or unloaded from pod units, or a combination of these.

In the example of FIG. 1, the exchange station 100 provides a terminal for loading and unloading pods from an elevated rail network. The rail network can provide high-speed transportation for commuters between two or more distant locations. For example, a passenger from the suburbs may be driven by a modular street vehicle to the exchange station 100. Equipment at the exchange station 100 may automatically detach the pod from the base unit of the vehicle and lift and secure the pod to the elevated rail network for efficient transport directly to a metropolitan area near a location where the passenger works. The same pod may then be connected to a different base unit at a second exchange station at a distal location of the elevated rail network, such as near the passenger's work location, for example. The vehicle formed from the new base-pod combination can then drive the passenger the final leg of the route to the passenger's work location.

In some implementations, pod units 102 in a fleet may have different configurations from each other and base units 104 in the fleet may also have different configurations from each other. A given base unit 104 may be capable of connecting to differently configured pod units 102. Likewise, a given pod unit 102 may be capable of connecting to differently configured base units 104. To ensure compatibility of a particular base-pod combination, the central computing system may maintain a database storing data representing a list of available pod configurations, a list of available base configurations, and acceptable combinations thereof. Authorized computing systems may query the database to determine whether a pod having a particular combination can be connected to a particular base. If the components are deemed compatible, the computing system may then assign the pod 102 to the base 104 and instructions can be transmitted (e.g., wirelessly) to the pod 102 and base 104 to cause or approve a connection of the pod and base units 102, 104. As discussed further below, a pod 102 and base 104 that have been, or are about to be connected, can also communicate to verify compatibility of the respective components (e.g., pod 102 and base 104), to adjust aspects of the respective components that may be necessary to facilitate a connection between the two, and to confirm that a safe and proper connection has been made between the pod 102 and the base 104.

When connected, a pod 102 and base 104 can provide a fully functional street vehicle (e.g., an automobile). The pod 102 and base 104 can include respective components that collectively enable the vehicle operation. In some implementations, the pod 102 includes a housing that defines a vehicle cabin or other enclosure for carrying passengers or freight. Pods 102 that are arranged to carry human passengers can include, within the cabin, one or more seats, a navigation console that provides an interface for passengers to input and modify navigation information (e.g., route destinations, points of interest), driving controls (e.g., steering, acceleration, and brake controls), environmental controls, multimedia controls, and instrumentation (e.g., speedometer, fuel level indicator, battery charge indicator). The pod 102 may further include one or more doors that provide entry and exit points for passengers and cargo, a cargo compartment, and windows.

In some implementations, sensors may be fixed to the pod 102 and may generate signals representative of various conditions of the pod 102, the environment of the pod 102, or both. For example, a pod 102 may include load sensors and locking sensors for verifying safe connection of the pod 102 to a base 104, and may further include imaging sensors, laser detectors, and ultrasonic sound transducers to generate signals as input to an autonomous driving computing system. In some implementations, the pod 102 may include a battery or other electrical power supply so that standalone systems in the pod 102 (e.g., environmental controls, multimedia systems) can function even when the pod 102 is not connected to a base 104. The pod 102 may further include one or more locks for securing the pod 102 to the base 104.

The base unit 104 includes a chassis, which is configured to support the pod unit 102 atop the base unit 104 and to facilitate a separable connection between the pod unit 102 and base unit 104. The base unit 104 can include two, three, four, or more wheels, a drivetrain, a gasoline engine or electric motor (or a hybrid gasoline-electric engine), a fuel tank (e.g., for gasoline to power an engine), a battery pack (e.g., to power the electric motor), autonomous driving sensors, modular connection sensors, or a combination of these. In some implementations, the base unit 104 can include a heating and air conditioning assembly that forces heated or cooled air into a pod unit 102 according to current environmental settings when the pod unit 102 is connected to the base unit 104.

In some implementations, the components of the base unit 104 are sufficient to allow for autonomous driving of the base unit 104, either with or without the pod unit 102 connected to the base unit 104. For example, the computing system on the base unit 102 may include an autonomous driving computing subsystem (ADCS) that processes navigation data and sensor data from the autonomous driving sensors to control steering, acceleration, and braking components of the base unit 104 to drive to particular destinations. The ADCS may include a wireless network interface that communicates over a high-speed wireless network with a central computing system remotely located from the base unit 104. The ADCS uses the wireless network interface to report location and status information associated with the base unit 104 to the central computing system, and to receive messages from the central computing system. The messages received from the central computing system may include, for example, navigation instructions for causing the base unit 104 to drive to particular destinations, optionally, at specified times and along specified routes.

The messages may also include pod-assignment information that identifies a particular pod unit 102 that has been assigned to connect with the base unit 104. Upon receiving pod-assignment information, the base unit 104 may locate the identified pod unit 102 and physically navigate to a location where the base unit 104 can be connected to the pod unit 102 (e.g., an exchange station 100).

In some implementations, the division of vehicle components among modular, separable pod units 102 and base units 104 can provide one or more advantages. To start, maintenance and repair of the respective units 102, 104 may be more readily carried out when the pod units 102 and base units 104 are separated from each other, e.g., due to improved accessibility of components of the units 102, 104. Additionally, a central computing system can, in some instances, more efficiently transport passengers and cargo among various locations. For example, the central computing system may monitor current transportation demand and forecast demand within a target region (e.g., a city). The system may then select combinations of pods 102 and bases 104 that, when connected, result in favorable vehicle characteristics to efficiently meet the demand.

Similarly, idling times of modular vehicles may be reduced as compared to conventional, non-modular vehicles. For example, a passenger may call a modular vehicle to transport the passenger from home to work. One segment of the passenger's route may involve high-speed transport via a rail network. A base unit 104 may carry the passenger's pod 102 to an exchange station 100, where the pod 102 is disconnected from the base unit 104 and placed on the rail network. Rather than idling in a non-use state while the pod 102 is on the elevated rail network, the base unit 104 can immediately be assigned a new pod unit 102 to pair with and transport. When demand is low and the fleet capacity is greater than what is necessary to meet current demand, the central computing system may direct a portion of the available pod units 102, base units 104, or both, in the fleet to designated storage locations so that the currently deployed fleet at any given time is optimized to meet current and projected demand.

Figure 2:
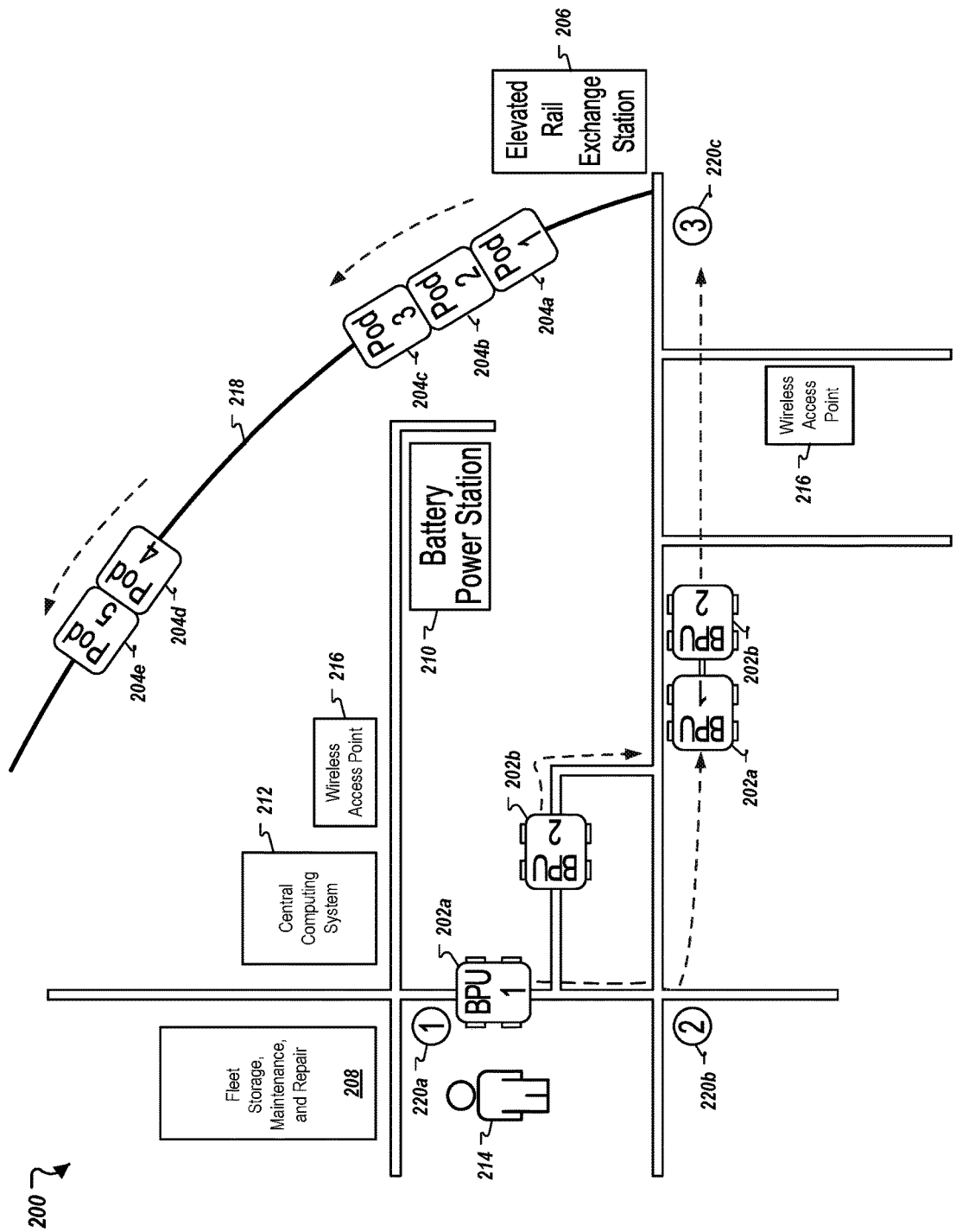
FIG. 2 diagrams a fleet of modular vehicles deployed within a geographic area and associated facilities within the area.

Referring to FIG. 2, a conceptual diagram is shown of a fleet of modular vehicles that have been deployed within a geographic region 200, such as a city, a residential district, or a business district of a city. The modular vehicles 202a-202b represented in FIG. 2 each includes one or more base units and one or more pod units that are removably connected to the one or more base units. In some implementations, the modular vehicles of FIGS. 1, 3, 4, and 5, including their respective pod and base units, may be deployed in the geographic region 200 and are represented by the modular vehicles 202a-202b in FIG. 2.

The geographic region 200 includes various infrastructure to support operation of the fleet of vehicles. The infrastructure can include, for example, a storage, maintenance, and repair facility 208, a battery power station 210, an elevated rail exchange station 206, a facility for a central computing system 212, and wireless access points 216. Depending on the size and transportation demands of a particular region 200, the region 200 may include only a subset of the facilities 206-212 or may include multiple ones of all or some of the facilities 206-212. For example, a highly populous region 200 may require two, three, or more storage, maintenance, and repair facilities 208, many wireless access points 216, and a network of multiple battery stations 210.

In some implementations, the storage, maintenance, and repair facility 208 is a designated location for storage, maintenance, and repair of pod units, base units, and other components and equipment associated with modular vehicles. The facility 208 may include one or more hangars or outdoor spaces for vehicle storage, and one or more garages for vehicle maintenance and repair. In some implementations, pods and bases that are out of service or temporarily unused may be routed to and stored at the facility 208. During peak times when transportation demand increases, additional vehicles may be deployed from the facility 208 to various locations across the region 200. The facility 208 may include equipment for connecting pod units to base units and for removing pod units from base units. Therefore, particular combinations of pods and bases can be assembled at the facility 208 according to instructions from the central computing system 212 or instructions from users or other computing systems. Generally, the system prevents base units from driving on public streets of the region 200 without a pod unit connected to the base unit. The central computing system 212, or local computing systems at the facility 208 or on a given base unit, may enforce rules that restrict the base unit from leaving the premises of the facility 208 without a pod unit connected to the base unit, unless an exception applies such as an emergency or a manual override command.

In some implementations, one or more battery stations 210 may be located throughout the region 200. Battery stations 210 are facilities that include battery chargers for pod units, base units, or both. In some implementations, battery packs on electrically powered pods and bases can be readily removed from their host pod or base unit and swapped at a battery station 210 for a fully charged battery. The availability of battery stations 210 for swapping depleted batteries with charged batteries can reduce incidences of "dead" vehicles on public roadways, and can increase the longevity of vehicle use before the vehicle is taken out of service for an extended period of time, e.g., for repairs and maintenance. In some implementations, a collection of battery stations 210 may be distributed throughout the region 200 so that stops for battery swaps can be conveniently made. For example, the vehicle's autonomous driving computing subsystem (ADCS) may constantly monitor the current battery charge of the vehicle. When the charge falls below a pre-defined threshold charge level, the ADCS may automatically detour from a route and navigate to the closest battery station 210. The threshold charge level may vary based on factors such as a projected depletion rate, distance of the vehicle to the closest available battery station 210, and traffic conditions.

The exchange station 206 is generally a designated location within region 200 in which base units and pod units can be connected to each other, and in which complete vehicle units can be safely disassembled by removal of pod units from their corresponding base units. In some implementations, an exchange station 206 serves as a switching point for the transportation system, e.g., a location where bases are connected with new pods, where passengers or cargo switch to different pods, where pods are connected to different transport modalities (e.g., transition from rail to street travel or vice versa), or a combination of these. In the example of FIG. 2, the exchange station 206 includes an access point to an elevated rail network 218. The rail network 218 may connect the region 200 to other population centers located a distance from the region 200. In some implementations, the rail network 218 provides a high speed and power efficient option for transporting greater numbers of pods to distant locations in faster times than could be done by driving the pods on individual base units from the region 200 to the distant locations. Moreover, as pods are disconnected from bases for departures on the rail network 218, the separated bases can then be connected to pods that have arrived at the exchange station 206 via the rail network 218 in the opposite direction. The vehicles formed from the new base-pod pairs can depart the exchange station 206 and drive to various locations within region 200.

In some implementations, the region 200 includes a central computing system 212 that manages region-wide aspects of the modular vehicle transportation system. The central computing system 212 can include one or more computers in one or more locations. Although the central computing system 212 is shown in FIG. 2 as being physically located in the same region 200 that it manages, other arrangements are also possible. For example, the central computing system 212 may include computers located entirely outside of the region 200, or may include some computers within the region 200 and other computers outside of the region 200. In general, the central computing system 212 may communicate over one or more wireless networks with pods, bases, and other components of modular vehicles located within the managed region 200. The central computing system 212 may also communicate with respective local computing systems at the storage, maintenance, and repair facility 208, the battery power station 210, exchange station 206, and other facilities and equipment associated with the transportation system. The region 200 may include a network of wireless access points having wireless transmitters and receivers for exchanging over-the-air messages between the central computing system 212 and local components such as bases, pods, and fixed facilities.

The central computing system 212 is configured to coordinate activities of pods, bases, and modular vehicle units within the region 200. In some implementations, the central computing system 212 is configured to receive and process trip requests from users within the region 200. In response to the trip requests, the system 212 can deploy vehicles to transport passengers or cargo according to parameters of the requests. A trip request can include a message transmitted from a user device (e.g., a smartphone, tablet computer, notebook computer, desktop computer) to the central computing system 212 that represents a request to reserve one or more modular vehicles for transporting passengers or cargo to particular locations within one or more transportation regions. The trip request can be parameterized with values that represent characteristics of the requested trip such as cargo type (e.g., passengers, consumer goods, commercial goods, construction material, animals), pickup time and location, destination, route preferences, pod preferences, autonomous or human-operated driving preference, or a combination of two or more of these. Pod preferences generally indicate preferred characteristics or configurations of pod units that the requesting user prefers for the trip. For example, a user may specify in a trip request an identifier for a particular pod that is privately owned by the user, to cause the system 212 to deploy for the user a modular vehicle that includes a base and the user's private pod. In some implementations, pod preferences may indicate a preference for particular pod configurations such as seating capacity of the pod, whether the pod may be shared with other passengers during the requesting user's trip, and preferences for amenities (e.g., environmental control options, radio and multimedia options).

Upon receiving a trip request, the central computing system 212 can assign assets (e.g., a pod-base pair) to utilize for the trip and deploys those assets in satisfaction of the request. The assigned assets may be selected from among sets of multiple assets that are available for the trip. For example, the central computing system 212 may determine a particular base-pod combination for the requested trip, transmit instructions for causing connection of the selected base and pod to assemble an operational vehicle, and for causing the vehicle to be sent to the requested pickup location. Passengers or other cargo can then be loaded into the vehicle, and the vehicle can transport the passengers or cargo to the target destination.

In some implementations, the central computing system 212 is configured to set parameters of both planned and ongoing trips so as to optimize one or more region-wide transportation metrics. As one example, the system 212 may use real-time location information that has been reported from vehicle computing systems and passengers' devices to constantly monitor current traffic conditions of roadways in the region 200. The system 212 may actively set and adjust navigational routes for deployed vehicles that are under control of the system 212 in order to optimize use of available roadways. For instance, during peak traffic times, the system 212 may divert some vehicles from primary roadways (e.g., highways) to secondary roadways (e.g., city streets) to prevent or avoid congestion on the highways.

The system 212 may also monitor traffic conditions and transportation demand over time to construct a predictive model that forecasts traffic conditions and transportation demand from users. The system 212 may use the model to meet forecasted transportation demand and optimize traffic conditions. For example, the system 212 may identify that a large-scale event (e.g., a professional football game) is scheduled to occur in the near future. In anticipation of the event, the system 212 may generate estimates of the demand for each of multiple configurations of modular vehicles. Based on the estimated demand for various configurations of vehicles, the system 212 may pre-select particular pods and base units to form vehicles that meet the demand. The system 212 may then pre-deploy the vehicles to particular locations in the region 200 that the system 212 estimates, based on the model, demand is most likely to occur, e.g., at the stadium, hotels, airports, and restaurants in vicinity of the stadium. In this manner, the system 212 may make pre-connected modular vehicles ready to respond to trip requests as requests are received at times associated with the event.

In some implementations, the central computing system 112 may coordinate the activities of two or more vehicles to meet objectives deemed to improve passengers' transport experiences. For many commuters, positive transport experiences result in part from minimizing the amount of time required to reach a target destination and minimizing the amount of "stall time" during which a commuter's progress in moving toward the target destination is temporarily slowed or stopped. Stalls can occur, for example, on roadways as a result of traffic congestion or at switching points where a passenger switches vehicles or transportation modalities. To reduce stall time, the central computing system 112 can dynamically adjust the routes and speeds of vehicles throughout the region 200, e.g., to avoid occurrences of traffic congestion and to reduce switching delays.

For example, the central computing system 212 may plan a trip for a passenger that involves both street travel and rail travel. During a first segment of the trip, a first modular street vehicle 202a formed from a particular pod-base pair is assigned to transport the passenger 214 from a pickup location 220a to a drop-off location 220c at exchange station 206. At the exchange station 206, the pod from the first modular vehicle 202a is disconnected from the base unit and is re-connected to the elevated rail network 218 for the trip's second segment. So as to minimize any delay in connecting to the elevated rail network 218, the central computing system 212 reserves a slot for the passenger's pod on the elevated rail network 218 and determines the precise time that the slot will be available for loading at the exchange station 206. The central computing system 212 then adjusts the speed or route of the first modular vehicle 202a to cause the first modular vehicle 202a to arrive at the drop-off location 220c of the exchange station 206 just in time for the passenger's pod to be transitioned from a street-level base unit to the reserved slot on the elevated rail network 218. Conversely, the central computing system 212 may also tune the speed of the elevated rail network 218 to match the arrival times of the reserved rail slot and the first modular vehicle 202a at the exchange station 206.

In some implementations, the central computing system 212 may coordinate the travel speed, route, and other parameters of trips associated with multiple different vehicles. For example, the central computing system 212 may cause two or more modular vehicles to travel in a "platoon." A platoon generally refers to a group of two or more vehicles that are driven in proximity to each other based on instructions communicated to the vehicles from the central computing system 212 and/or messages communicated among the vehicles in the platoon. In some implementations, the platoon forms a sequence of vehicles driven in a single-file line. Platoons may be formed for various reasons. In some examples, the platoon forms a train of physically connected vehicles, thereby allowing batteries in one or more of the vehicles to be charged by batteries in other ones of the vehicles in the platoon. Platooning can also reduce air resistance for all or some of the vehicles in the platoon, thereby improving power efficiencies of vehicles in the platoon and extending battery life or fuel efficiencies. In some implementations, the central computing system 212 facilitates the formation of platoons by transmitting information to vehicles that allows them to efficiently locate and connect with other vehicles in the platoon. For example, the computing system 212 may identify the first modular vehicle 202a and a second modular vehicle 202b as candidate vehicles for a new platoon based on the vehicles 202a, 202b being within a threshold distance of each other in the region 200 and further based on identification that the vehicles 202a, 202b are both traveling to or through the same location (e.g., the exchange station 206). The central computing system 212 can then adjust the traveling speed, route, or other trip parameters of at least one of the first modular vehicle 202a or the second modular vehicle 202b to cause their paths to intersect along the way to the exchange station 206. When the two vehicles 202a, 202b intersect (e.g., come in close proximity to each other), they may form a platoon and travel to the exchange station 206 together, along with none, one, or more other vehicles in the platoon.

Turning to FIG. 3, a conceptual diagram is shown of various modular street vehicles 306a-c that can be formed from different combinations of pod units 302a-c and one or more base units 304. In some implementations, the pod units 302a-c, base unit 304, and assembled modular vehicles 306a-c are representative of the pod units, base units, and modular vehicles, respectively, discussed in this specification with respect to FIGS. 1, 2, 4, and 5.

Three pod units 302a-c are shown, each with a different configuration from the others. The pod units 302a-c are all designed to carry at least one, fully grown human occupant. In some implementations, the pod units 302a-c may have storage compartments that hold luggage or other cargo in addition to the human occupants. The pod units 302a-c include a frame, doors, and windows that collectively define a housing of a vehicle cabin for a human-occupiable space. Although the example pod units 302a-c are each configured to transport human passengers, other types of pod units may be adapted to carry only non-human cargo such as consumer goods, commercial goods, construction material, or animals.

The configuration of a pod unit generally refers to characteristics of the pod unit that bear on the ability of the pod unit to connect to a given base unit. If the configuration of a pod unit is such that it can be connected to a given base unit, the configuration of the pod unit can further refer to characteristics of the pod unit that bear on the interaction between the pod unit and the base unit. Example characteristics of pod units include structural dimensions of the pod unit (e.g., maximum length, width, height); unloaded weight of the pod unit; loaded weight capacity of the pod unit; size and shape of a mating component of the pod unit that is configured to physically interface with a complementary mating component of the base unit; presence or absence of auxiliary power sources (e.g., an auxiliary battery pack) on the pod unit; presence or absence of human-operable driving controls in the pod unit (e.g., steering control, brake pedal, acceleration pedal); configuration of locks on the pod unit for securing the pod unit to the base unit; configuration of sensing components on the pod unit (e.g., autonomous driving sensors); configuration of a data interface for connecting a computing system of the pod unit to a computing system of the base unit; or a combination of these characteristics and others. In some implementations, all or some of the foregoing characteristics may comply with a set of standards set forth in technical specifications for ensuring compatibility of a pod unit with a base unit. Technical specifications can be used by independent manufacturers to develop and produce pod units with different designs and configurations that are nonetheless compatible with standards-compliant base units.

Three different configurations of pod units 302a-c in particular are shown in FIG. 3. The first pod unit 302a has a first configuration, the second pod unit 302 has a second configuration, and the third pod unit 302c has a third configuration. The first pod unit 302a has a first length that matches the length of the base unit 304, a first width that matches the width of the base unit 304, and is configured to seat two passengers. The second pod unit 302b has the first length that matches the length of the base unit 304 and the first width that matches the width of the base unit 304, although the second pod unit 302b is configured to seat four passengers rather than two. The third pod unit 302c has the first length that matches the length of the base unit 304 and has a second width that is about twice the width of the base unit 304. The third pod unit 302 is further configured to seat six passengers (not shown).

The pod units 302a-c and base unit 304 have modular designs that allow any one of the differently configured pod units 302a-c to be connected to the base unit 304 or to multiple base units 304. Secure connection of a pod unit to a base unit results in a fully assembled vehicle. Three examples of fully assembled vehicles are shown at the right of FIG. 3. For example, vehicle 306a is formed from the connection of pod unit 302a to base unit 304, vehicle 306b is formed from the connection of pod unit 302b to base unit 304, and vehicle 306c is formed from the connection of pod unit 306c to a pair of base units 304 that have been secured adjacent to each other along their sides.

Although FIG. 3 shows just one base unit 304 having a particular configuration, in some implementations, a fleet of vehicle components may include many base units and at least some of the base units may have different configurations from each other. In some examples, a central computing system can select a base unit from the fleet that is deemed suitable for a given trip, e.g., based on parameters specified in a trip request from a user. For example, a base unit with a large chassis and high-powered motor or engine can be selected for a trip that requires a larger pod to transport a large load. In contrast, a base unit with a smaller motor and smaller chassis that couples to a smaller pod may be suitable for short trips with smaller loads (e.g., 1-2 passengers). The configuration of a base unit generally refers to various characteristics of the base unit that affect whether the base unit can connect to various configurations of pod units and that affect how the base unit interacts with various configurations of pod units. Example base unit characteristics include automotive type (e.g., gasoline engine, electric motor, hybrid-electric engine), outer dimensions (e.g., length, width, ground clearance), pod-interface dimensions (e.g., size of chassis for receiving a mating component of a pod unit), load capacity (e.g., maximum weight of pod unit and associated cargo that can be supported by the base unit), driving configuration (e.g., user-controlled, autonomous, or capabilities for both), configuration of locks on the base unit for securing the pod unit to the base unit; configuration of sensing components on the pod unit (e.g., autonomous driving sensors), or a combination of these.

In some implementations, a set of modular vehicle components may include pairs of base-pod units having configurations that are compatible with each other and other pairs of base-pod units having configurations that are incompatible with each other. Pairs of compatible base-pod units are eligible to be connected with each other to form an assembled vehicle for trips. Pairs of incompatible base-pod units are ineligible to be connected with each other to form an assembled vehicle for trips. For example, a base-unit that lacks an autonomous driving subsystem may be incompatible with a pod unit that lacks human-operable vehicle controls, because such a pod unit would require a base unit with an autonomous driving capability.

In some implementations, a central computing system that manages a fleet of modular vehicles and their components can maintain a database that stores information about pod units, base units, and compatibility information. For example, the database may include, for each base unit and pod unit associated with the fleet, a unique identifier for the base or pod unit and an indication of the configuration of the base or pod unit. The database may also store data that identifies combinations of base unit configurations and pod unit configurations that are compatible or incompatible with each other. Based on the information contained in the database, the central computing system can process a trip request and, based on trip parameters associated with the request, can select a base unit and a pod unit for a vehicle that will be used to transport a load in accordance with the request. The computing system may use the compatibility information stored in the database to verify that the selected base unit and pod unit are compatible with each other. If they are not, the computing system may then select a different base unit, a different pod unit, or both, that are determined to be compatible with each other.

In some implementations, a base unit and pod unit that have been selected for connection as an assembled vehicle may be compatible but may require one or more adjustments from an initial state to enable connection of the base unit to the pod unit. The adjustments may involve setting mechanical parameters, electrical parameters, or both, of at least one of the base unit or the pod unit. In one example, the base unit 304 may include four wheels by default, e.g., for transporting narrower pod units 302a or 302b. However, when multiple base units 304 are required to transport the wider pod unit 302c, two wheels on each of the base units 304 may be automatically removed or withdrawn to facilitate concurrent use of the pair of base units 304. In some implementations, the chassis of the base unit 304 may include one or more adjustable components can be moved into various positions to accommodate the particular size and geometry of a given pod unit that is to be connected to the base unit 304. Upon identifying the configuration of a pod unit that is about to be connected to the base unit 304, a computing system on the base unit 304 may generate signals that cause one or more small motors on the base unit 304 to move the adjustable components of the chassis to match the size and geometry of a portion of the pod unit that engages the chassis of the base unit 304.

In some implementations, one or more computing systems on the base unit 304 may be reconfigured based on the particular configuration of a pod unit that has been, or is assigned to be, connected to the base unit 304. In some instances, for example, differently configured pod units may include different sets of sensing components. One or more computing systems on the base unit 304 may use data representing signals generated by sensing components of a pod unit as inputs to one or more models or procedures. As different pod units may include different sets of sensing components, the computing systems on the base unit 304 may activate inputs to the models or procedures for available sensing components (e.g., sensing components that are part of the pod unit, base unit, or both) and may de-activate inputs to the models or procedures for unavailable sensing components (e.g., sensing components that are not part of the pod unit or the base unit). Even when sensor data for some sensor components is unavailable, the computing system of the base unit 304 may still evaluate models and procedures on the computing system based on sensor data from the available set of sensing components, so long as a pre-defined minimum set of sensor data (e.g., from critical sensing components) or other input data is available. For example, the base unit 304 may include an autonomous driving computing system (ADCS) that controls driving operations of the base unit 304 or of an assembled vehicle that includes the base unit 304 and a pod unit connected to the base unit 304.

The ADCS may process sensor data representing signals generated by available sensing components to perform autonomous driving operations (e.g., steering, acceleration, braking). The base unit 304 may be compatible with both the first pod unit 302a and the second pod unit 302b, even if the first pod unit 302a includes radar and image sensors but the second pod unit 302b does not. When the first pod unit 302a is connected to the base unit 304, the ADCS can use data corresponding to signals from the radar and image sensors of the first pod unit 302a to determine driving operations for the vehicle. When the second pod unit 302b is connected to the base unit 304, radar and image data from the pod unit 302b is not available and so the autonomous driving system determines driving operations for the vehicle without the benefit of such data. For example, the autonomous driving system may rely on data from different sensors on the second pod unit 302b, data from sensors on the base unit 304, or a combination of these, to operate the vehicle and determine driving operations during a trip. In some implementations, certain types of sensor data from a pod unit may be required input to the autonomous driving system of a base unit 304. If a particular pod unit lacks the types of sensors to generate required inputs to the autonomous driving system, then the autonomous driving system may be disabled.

Figure 4:
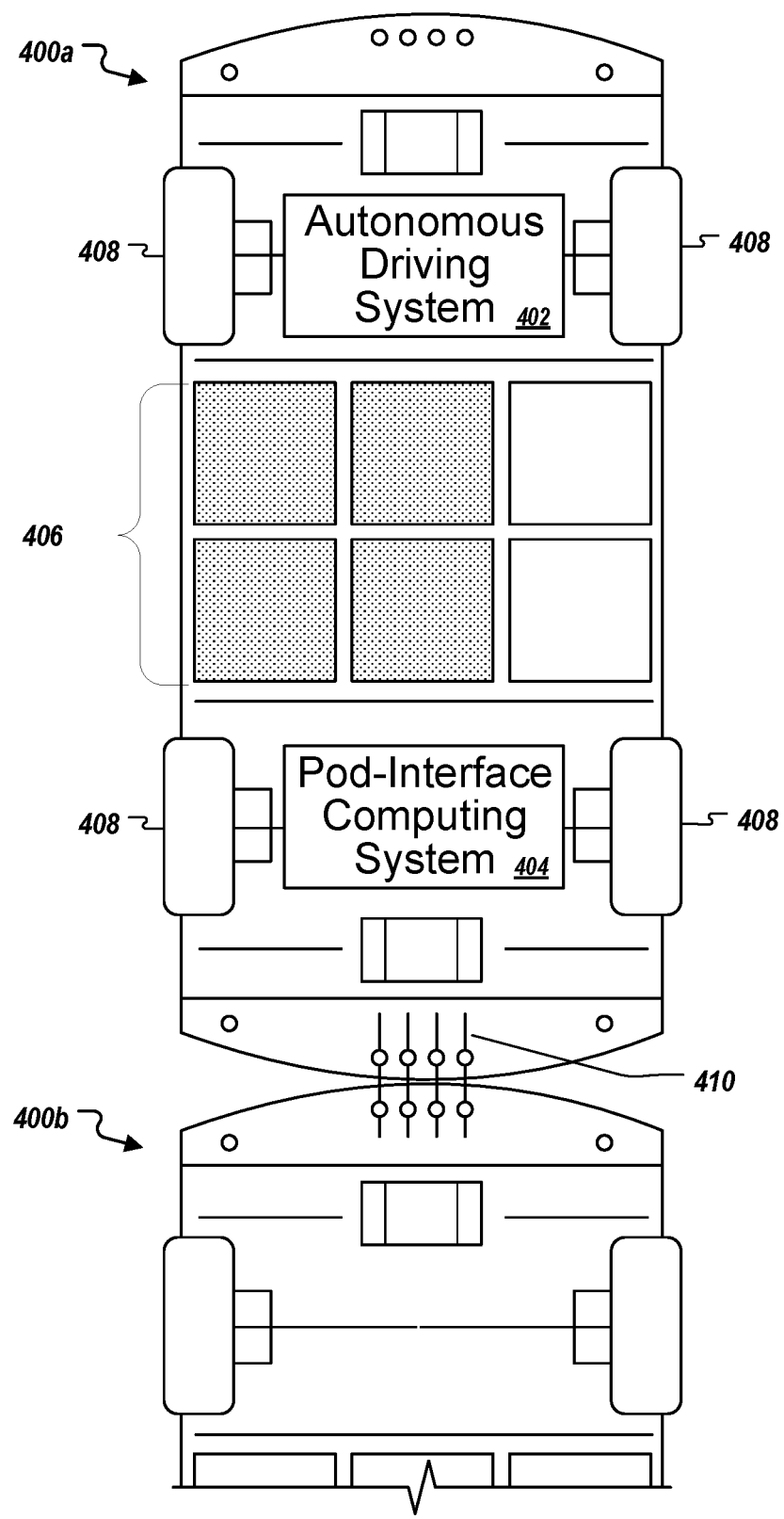
FIG. 4 depicts a schematic diagram of an example base unit for a modular vehicle.

FIG. 4 is a schematic diagram of an example base unit 400a for a modular vehicle. In some implementations, the base unit 100a is representative of base units discussed throughout this specification, including base unit 304 of FIG. 3. The base unit 400a is configured in a particular manner, but other configurations of base units are also contemplated as discussed elsewhere in this specification.

The base unit 400a provides a generally horizontal platform that supports various vehicle components and that is configured to support a detachably connected vehicle pod. Without a vehicle pod connected, the base unit 400a may not be configured to transport either human or non-human cargo on public roadways, e.g., because it lacks a vehicle cabin and other structures for comfortably and safely driving such cargo. A vehicle pod may be connected to the base unit, however, to form an assembled vehicle that is configured to transport one or more classes of cargo. In some implementations, a base unit may include core components for powering the vehicle (e.g., drivetrain, fuel or battery, motor or engine) and a navigational computing system, while the pod unit provides a cabin to accommodate passengers and other cargo.

The example base unit 400a, in particular, is configured as an electric, autonomous (self-driving) vehicle. For instance, the base unit 400a includes an autonomous driving computing system 402, a pod-interface computing system 404, a set of batteries 406, and a set of wheels 408 coupled to axles of the base unit 400a. The batteries 406 provide electric energy to one or more motors on the base unit 400a, the autonomous driving computing system 402 controls driving operations of the base unit 400a (e.g., steering, braking, acceleration) based on navigational information and information about the environment of the base unit 400a (e.g., road obstacles, driving rules, detected vehicles and objects in a vicinity of the base unit 400a). The pod-interface computing system 404 is configured to perform a verification procedure when a pod is connected to the base unit 400a to confirm that the connection is secure and that the pod can be safely transported atop the base unit 400a.

In some implementations, the base unit 400a can include connectors 410 that are configured to connect to other base units, e.g., base unit 400b. The connectors 410 may provide a mechanical connection that physically links the first base unit 400a to base unit 400b, such as a ball-and-socket hitch. The connectors 410 can also provide an electrical connection between base units 400a and 400b that, for example, facilitates battery charging across the base units 400a and 400b. In some implementations, the connectors 410 can hold a platoon of vehicles together as they are driven.

FIG. 5 depicts a flowchart of an example process 500 for identifying and validating a proper connection between a pod unit and a base unit in an assembled vehicle. In some implementations, the process 500 may be performed by a computing system that is installed in a base unit of a modular vehicle, e.g., the pod-interface computing system 404 of FIG. 4 or like computing systems of base units discussed throughout this specification.

At stage 502, the computing system on the vehicle base unit identifies that a pod unit is detachably connected, or is about to be detachably connected, to the base unit. The base unit and pod unit may, for example, have been selected to form an assembled vehicle that can transport passengers or non-human cargo for a particular trip. In some implementations, the base computing system may identifies the pod unit that is to be connected to base unit before the pod unit is physically connected to the base unit. For example, a wireless interface of the base unit may wirelessly communicate with a central computing system that is separate and remote from both the base unit and the pod unit. The central computing system may process trip requests from end users and may proactively seek to meet projected transportation demand by managing sets of pod units and base units within one or more regions. Based on parameters associated with a trip request, or based on estimated requirements for forecasted trips, the central computing system determines a proposed pod-base unit pair to combine as an assembled vehicle for a trip. In some implementations, the central computing system transmits, to the base computing system, an identifier of the pod unit that has been selected to connect to the base unit.

Upon receiving the identifier of the pod unit from the central computing system, the base unit navigates to a current location of the pod unit so that the two units can be connected. In some implementations, external robotic equipment may be used to lift and place the pod unit on the base unit. In some implementations, the pod unit and base unit may be configured so as to make it feasible for one or two adult humans to connect the pod unit to the base unit. For example, the pod unit may have retractable roller wheels that allow it to be rolled by one or more persons into position over a base unit and lowered into place on the base unit. In some implementations, the pod and base unit may be configured to automatically connect with each other independent of any external assistance.

In some implementations, instructions transmitted from the central computing system to the computing system of the base unit may identify a configuration of a pod that the base unit should connect to, rather than identifying a particular pod unit. The base unit can then select the particular pod unit having the configuration specified in the instructions from the central computing system. In some implementations, the base unit selects the particular pod unit by querying a database stored on the base computing system, the central computing system, or a facility computing system (e.g., a computing system of a storage, maintenance, and repair facility where the base unit is located) that indicates available pod units and their respective configurations. The base unit may select a particular pod unit from among multiple available pod units having the specified configuration based on factors such as proximity of the pod unit to the base unit, level of battery charge of the pod unit, maintenance schedules of available pod units, and respective costs of use of the available pod units. In some implementations, the central computing system provides the computing system of the base unit with one or more pod characteristics. The base computing system then coordinates selection of a pod unit having characteristics that match the pod characteristics specified in instructions form the central computing system, e.g., by query the database on the base computing system, the central computing system, or the facility computing system for available pod units having the specified characteristics.

In some implementations, the computing system of a base unit may not be made aware of a pod unit until the pod unit is physically connected to the base unit. For example, assembly equipment at a storage facility may engage a pod unit to a base unit without a priori notice to the base computing system. As the pod unit is secured to the base unit, various mechanical and electrical connections can be established such as between locks that hold the pod unit to the base unit and electrical connectors that interface the base computing system with a computing system of the pod unit. In some implementations, sensors associated with various connection points between the base unit and pod unit can generate signals indicative of whether the pod unit is secured to the base unit. The base computing system process signals from the connection sensors to detect that a pod unit has been connected to the base unit. In response to detecting connection of the pod unit to the base unit, the base computing system or pod computing system invokes a handshaking procedure by exchanging messages with each other. For example, the base computing system may request the pod's unique identifier and the pod computing system responds with the pod's identifier. Similarly, the pod computing system may request the base unit's unique identifier and the base computing system can respond with the base's identifier. The pod and base may exchange other information as well, including information that represents the respective configurations of the pod and base units.

At stage 504, the computing system of the base unit establishes data connections with one or more components of the pod unit. For example, a physical (e.g., wired) communications link, a secure wireless communications link, or both, may be established between a computing system on the pod unit and the base computing system. A physical communications link is generally established when the pod unit is physically brought into engagement with and secured to the base unit. However, a wireless communications link may be established either before the pod unit is connected to the base unit or in response to the pod unit being connected to the base unit. In some implementations, before assembly of the respective units, the base and pod units can begin communicating with each other wirelessly in preparation for their impending connection. Then, once the base unit and pod unit are physically connected, communications among the base computing system and pod computing system may transition from the wireless link to a physical link.

Communications between the base computing system and pod computing system may be encrypted to protect the secrecy and integrity of the communications. In some implementations, the central computing system may generate and provide complementary cryptographic keys to the base computing system and the pod computing system (e.g., shared secret keys or a public-private key pair) immediately after the units have been designated for assembly. The life of the keys may be made to coincide with one or more trips or to coincide with the duration of the connection between the base unit and pod unit, to prevent unauthorized future uses of the keys.

In addition to communicating directly with each other, the pod and base units of an assembled vehicle may also communicate (e.g., wirelessly) with other pod units, other base units, and other computing systems remote from the assembled vehicle. In some implementations, the central computing system can assign a unique identifier to an assembled vehicle that is used to identify the vehicle while the base unit and pod unit are connected. For example, the base computing system in a base unit of an assembled vehicle may be responsible for communications with other vehicles and the central computing system. For matters concerning the interface of the base unit and pod unit, the base computing system may identify itself with a base unit identifier. But for navigational purposes (e.g., planning routes, reporting status and location during a trip), the base computing system may use the vehicle identifier, rather than the base identifier, to identify the assembled vehicle in messages exchanged with external computing systems.

At stage 506, the computing system of the vehicle base unit identifies the configuration of a pod unit that has recently been connected to the base unit or that is selected for future connection to the base unit. The configuration of a pod unit generally refers to characteristics of the pod unit that bear on the ability of the pod unit to connect to a given base unit. If the configuration of a pod unit is such that it can be connected to a given base unit, the configuration of the pod unit can further refer to characteristics of the pod unit that bear on the interaction between the pod unit and the base unit. Example characteristics of pod units that can impact the connectivity or interactivity of the pod unit with the base unit include structural dimensions of the pod unit (e.g., maximum length, width, height); unloaded weight of the pod unit; loaded weight capacity of the pod unit; size and shape of a mating component of the pod unit that is configured to physically interface with a complementary mating component of the base unit; presence or absence of auxiliary power sources (e.g., an auxiliary battery pack) on the pod unit; presence or absence of human-operable driving controls in the pod unit (e.g., steering control, brake pedal, acceleration pedal); configuration of locks on the pod unit for securing the pod unit to the base unit; configuration of sensing components on the pod unit (e.g., autonomous driving sensors); configuration of a data interface for connecting a computing system of the pod unit to a computing system of the base unit; or a combination of these characteristics and others.

In some implementations, the base computing system determines an expected pod configuration for a given pod by querying a database that associates pod identifiers with information about the configurations of corresponding pods. The base computing system may submit the pod identifier to the database for a pod that is connected, or is about to be connected to the base unit. In response to the query, the database returns information about the pod configuration that corresponds to the pod identifier. The pod configuration information can be an identifier that represents a particular one of a set of pod configurations, from which the computing system can then use to query the same or another database to identify a set of pod characteristics associated with the particular pod configuration. The expected configuration of a pod can be identified by the base computing system in advance of the pod unit being connected to the base unit or after the pod unit is connected to the base unit.

In some implementations, the base computing system verifies the expected configuration of a pod unit based on whether actual characteristics of the pod match characteristics associated with the expected pod configuration. After the pod unit has been connected to the base unit, the base computing system may run a diagnostics procedure to identify characteristics of the connected pod unit such as its outer dimensions, passenger capacity, weight, and sensor package configuration. One or more of the characteristics may be measured based on signals from sensors on the base unit or the pod unit. The base computing system may check other characteristics by querying the pod computing system for information about those characteristics, if the characteristics cannot be observed by other means. If any of the observed characteristics of the pod unit is different from characteristics associated with the expected configuration of the pod unit, the base computing system may confirm that the base unit configuration is still compatible with the actual (observed) configuration of the pod unit. If the pod and base units compatible, the base computing system can make appropriate adjustments to account for the differences between the expected and actual pod configurations and proceeds to carry out a trip accordingly. If the pod and base units are incompatible, the base unit notifies the central computing system and takes appropriate action such as deactivating an autonomous driving capability of the vehicle or removing the pod unit from the base unit. The central computing system may then re-assign the trip that was to be carried out by the defective vehicle to a different vehicle having a different pod-base pair, or the central computing system may identify a new pod unit for the base unit to pair with to carry out the trip.

At stage 508, the base computing system performs a verification procedure to confirm that a recently connected pod unit is properly connected to the base unit and can be safely transported during a trip. Based on the identified configuration of the connected pod unit, the base computing system determines a set of verification criteria that must be satisfied or waived if the vehicle is to be permitted to operate. The base computing system may run through each criterion in the set and confirm that it is either satisfied or waived. If the entire set of criteria is satisfied, the base computing system transitions the vehicle into an operational mode. In the operational mode, the vehicle can be driven (e.g., by a human or autonomously) and can carry out trips to transport people or goods to various destinations. However, if any of the criteria is not satisfied and is not waived, then the base computing system may "lock" one or more capabilities of the vehicle, including preventing the vehicle from transitioning into operational mode. When the vehicle is not in the operational mode, the base computing system disables one or more capabilities of the vehicle, which can include preventing the vehicle from being driven. In some implementations, an authorized user can waive certain verification criteria by providing input to an interface on the pod unit, the base unit, or at a location remote from the vehicle.

In some implementations, the verification procedure involves checking aspects of the pod-base interconnection. For example, one or more locking components may secure the base unit to the pod unit to prevent the base unit from separating from the pod unit during operation. Sensors in the locking components may generate signals representing a condition of the locking components, e.g., locked or unlocked. The base computing system may interpret these signals from the lock sensors to verify that the pod unit is properly locked to the base unit. The base computing system may further interpret signals from various other sensors associated with the pod-base interconnection to verify the pod unit is safely connected to the base unit as well, such as pressure transducers that can be used to measure the weight of the pod unit on the base unit and orientation sensors that can be used to verify the relative orientation of the pod unit with respect to the base unit. The base computing system can also check that connections between various subsystems of the pod and base units have been properly made. For example, the computing system may confirm that an electrical power connection between pod and base is established, that a data connection between respective computing systems of the pod and base is established, and that driving, environmental, and multimedia controls in the pod unit are operable to generate signals that are recognizable by a computing system in the base unit.

In some implementations, the verification procedure further involves checking the operational status of various subsystems and components of the pod unit, the base unit, or both. The operational status of these subsystems may or may not relate to the pod-base interconnection but can still bear on the operational status of the vehicle. For example, base computing system may confirm that navigational subsystems and autonomous driving subsystems of the vehicle pass various tests indicative of their operational status before the vehicle can transition into operational mode. Once a vehicle is in operational mode, the verification procedures can continue to be run on a constant basis to monitor the health of the vehicle.

In some implementations, as part of the verification procedure, the pod unit, the base unit, or both may reconfigure aspects of their respective systems to facilitate the connection of the pod unit to the base unit. An autonomous driving system in the base unit, for example, may be reconfigured based on the types of sensor data that are available from the pod unit. Moreover, the autonomous driving system may be activated or deactivated based on whether the pod unit includes activated human-operated driving controls (e.g., a steering wheel, acceleration pedal, and brake pedal).

Figure 6:
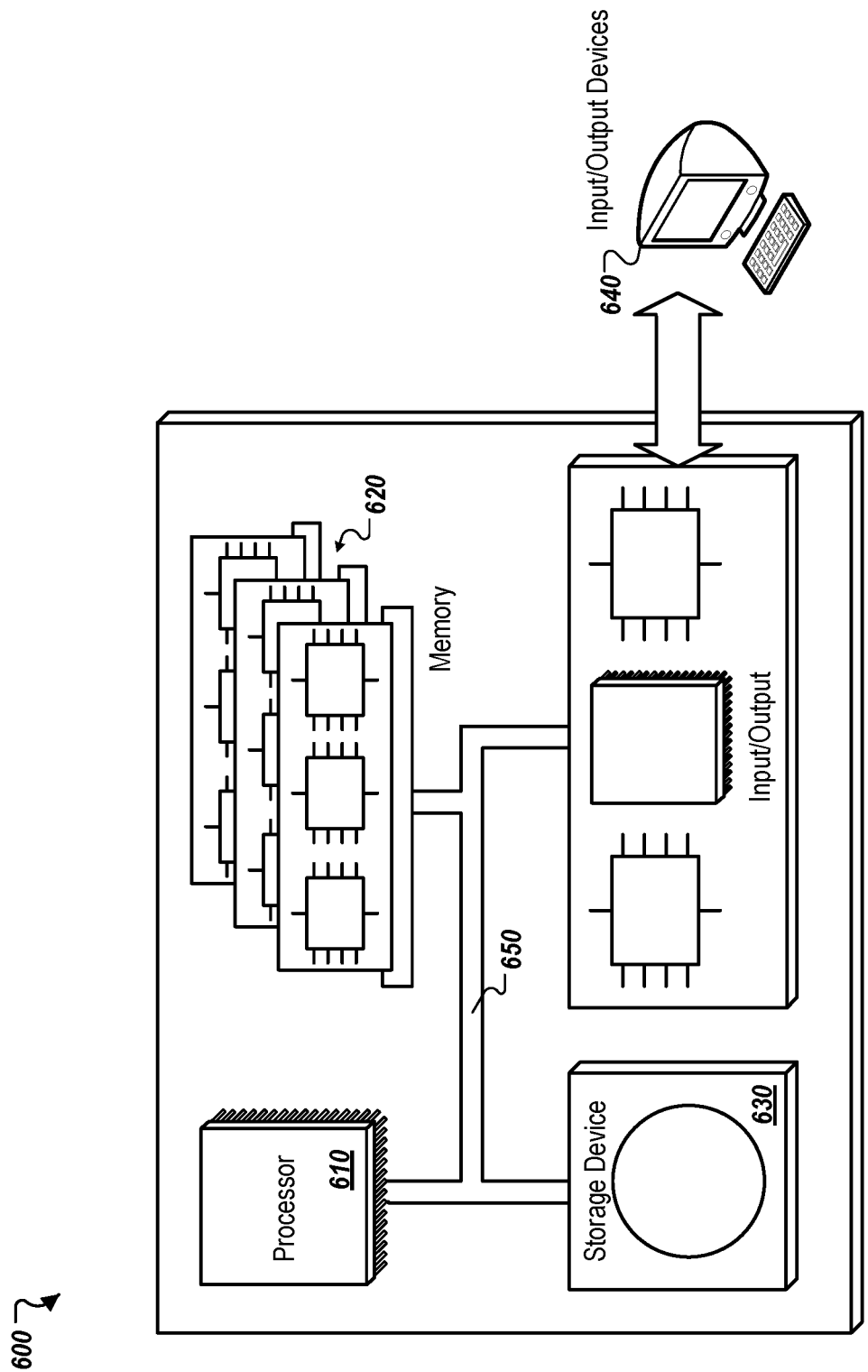
FIG. 6 depicts a schematic diagram of a computer system that may be applied to any of the computer-implemented methods and other techniques described herein.

FIG. 6 is a schematic diagram of a computer system 600. The system 600 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 600) and their structural equivalents, or in combinations of one or more of them. The system 600 is intended to include various forms of digital computers, such as laptops, desktops, workstations, personal digital assistants, servers, blade servers, mainframes, and other appropriate computers, including vehicles installed on base units or pod units of modular vehicles. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 400. In one implementation, the storage device 630 is a computer-readable medium. In various different implementations, the storage device 630 may be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A vehicle base for transporting a detachable vehicle pod, the vehicle base comprising:
    an engine or motor;
    a drivetrain configured to deliver power from the engine or the motor to at least one wheel coupled to the vehicle base;
    a chassis configured to support the vehicle pod and enable a detachable connection of the vehicle pod to the vehicle base;
    one or more sensing components configured to generate at least one signal representing a presence of the vehicle pod on the chassis of the vehicle base; and
    a computing system, including one or more processors, configured to:
        (i) monitor the at least one signal to determine that the vehicle pod is currently connected to the vehicle base; and
        (ii) in response to determining that the vehicle pod is currently connected to the vehicle base, exchange messages with the vehicle pod to identify a configuration of the vehicle pod;
    wherein the computing system is configured, in response to identifying the configuration of the vehicle pod, to adjust a set of operational parameters of the vehicle base to enable the vehicle base to interoperate with the vehicle pod having the identified configuration.

2. The vehicle base of claim 1, further comprising an autonomous navigation computing system, including one or more processors, configured to generate control signals that cause the vehicle base to autonomously navigate to a specified destination,
    wherein the vehicle base is configured to autonomously navigate with the vehicle pod connected to the vehicle base, and
    the vehicle base is configured to autonomously navigate without the vehicle pod connected to the vehicle base.

3. The vehicle base of claim 1, wherein the vehicle base excludes a human-occupiable space.

4. The vehicle base of claim 1, wherein the chassis is configured to enable detachable connection of differently-sized vehicle pods to the vehicle base.

5. The vehicle base of claim 1, wherein the computing system is further configured to:
    identify the configuration of the vehicle pod from among a plurality of registered configurations of vehicle pods that are capable of being connected to the vehicle base; and
    verify that the at least one signal representing the presence of the vehicle pod on the chassis of the vehicle base is consistent with the vehicle pod having the particular identified configuration.

6. A vehicle base for transporting a detachable vehicle pod, the vehicle base comprising:
    an engine or motor;
    a drivetrain configured to deliver power from the engine or the motor to at least one wheel coupled to the vehicle base;
    a chassis configured to support the vehicle pod and enable a detachable connection of the vehicle pod to the vehicle base;
    one or more sensing components configured to generate at least one signal representing a presence of the vehicle pod on the chassis of the vehicle base; and
    a computing system, including one or more processors, configured to:
        (i) monitor the at least one signal to determine that the vehicle pod is currently connected to the vehicle base; and
        (ii) in response to determining that the vehicle pod is currently connected to the vehicle base, exchange messages with the vehicle pod to identify a configuration of the vehicle pod;
    wherein the one or more sensing components include at least one of (i) a load sensor arranged to generate a load signal that represents a load supported by the chassis or (ii) a lock sensor arranged to generate a lock signal that represents whether a lock is in a locked state, the lock configured to secure the vehicle pod to the vehicle base; and
    the computing system is configured to determine whether the vehicle pod is currently connected to the vehicle base based on at least one of (i) identifying that the load supported by the chassis, as indicated by the load signal, matches a load profile of the vehicle pod or (ii) identifying that the lock is in the locked state, as indicated by the lock signal.

7. A vehicle base for transporting a detachable vehicle pod, the vehicle base comprising:
    an engine or motor;
    a drivetrain configured to deliver power from the engine or the motor to at least one wheel coupled to the vehicle base;
    a chassis configured to support the vehicle pod and enable a detachable connection of the vehicle pod to the vehicle base;
    one or more sensing components configured to generate at least one signal representing a presence of the vehicle pod on the chassis of the vehicle base; and
    a computing system, including one or more processors, configured to:
        (i) monitor the at least one signal to determine that the vehicle pod is currently connected to the vehicle base; and
        (ii) in response to determining that the vehicle pod is currently connected to the vehicle base, exchange messages with the vehicle pod to identify a configuration of the vehicle pod;
    wherein the chassis comprises:
        (i) a platform having a complementary shape to an underside of the vehicle pod, such that the platform can engage and support the vehicle pod when the vehicle pod is connected to the vehicle base; and
        (ii) one or more locks configured to secure the vehicle pod on the platform when the vehicle pod is connected to the vehicle base.

8. A vehicle base for transporting a detachable vehicle pod, the vehicle base comprising:
    an engine or motor;
    a drivetrain configured to deliver power from the engine or the motor to at least one wheel coupled to the vehicle base;
    a chassis configured to support the vehicle pod and enable a detachable connection of the vehicle pod to the vehicle base;
    one or more sensing components configured to generate at least one signal representing a presence of the vehicle pod on the chassis of the vehicle base; and
    a computing system, including one or more processors, configured to:
        (i) monitor the at least one signal to determine that the vehicle pod is currently connected to the vehicle base; and (ii) in response to determining that the vehicle pod is currently connected to the vehicle base, exchange messages with the vehicle pod to identify a configuration of the vehicle pod;

wherein the computing system is further configured to:

verify that the connection of the vehicle pod to the vehicle base meets a set of operational criteria, including evaluating the at least one signal from the one or more sensing components with respect to the set of operational criteria; and in response determining that the connection of the vehicle pod to the vehicle base does not meet the set of operational criteria, disabling an autonomous navigation capability of the vehicle base.

9. A human-occupiable street vehicle, comprising:

the vehicle base of claim 1, and the vehicle pod, wherein the vehicle pod is detachably connected to the vehicle base, and the vehicle pod comprises a housing that defines a human-occupiable space.

10. A computer-implemented method, comprising:

identifying, by a computing system installed in a vehicle base, that a vehicle pod is detachably connected, or is about to be detachably connected, to a chassis on the vehicle base, wherein the vehicle base includes a motor or engine configured to propel the vehicle base while the vehicle pod is connected to the chassis on the vehicle base;

in response to identifying that the vehicle pod is detachably connected, or is about to be detachably connected, to the chassis on the vehicle base, establishing a communications link between the computing system installed in the vehicle base and a computing system installed in the vehicle pod;

based on information obtained through the communications link, determining, by the computing system installed in the vehicle base, a configuration of the vehicle pod that is detachably connected, or is about to be detachably connected, to the chassis on the vehicle base; and verifying, by the computing system installed in the vehicle base, that the vehicle base can safely transport the vehicle pod while the vehicle pod is detachably connected to the chassis on the vehicle base.

11. The computer-implemented method of claim 10, wherein:

the vehicle pod comprises a housing that defines a human-occupiable space, the vehicle base is not configured to be human-occupiable, and the vehicle base is configured to autonomously navigate without the vehicle pod being detachably connected to the vehicle base.

12. The computer-implemented method of claim 10, further comprising:

identifying, by the computing system installed in the vehicle base, a set of vehicle pod parameters that correspond to the identified configuration of the vehicle pod that is detachably connected, or is about to be detachably connected, to the chassis on the vehicle base; and adjusting, by the computing system installed in the vehicle base and based on the identified set of vehicle pod parameters that correspond to the identified configuration of the vehicle pod, a set of vehicle base parameters that define operational characteristics of the vehicle base.

13. The computer-implemented method of claim 12, wherein:

the set of vehicle pod parameters includes at least one of a size of the vehicle pod or a power rating of the vehicle pod; and adjusting the set of vehicle base parameters respectively includes at least one of adjusting a size of the chassis to match the size of the vehicle pod or configuring a power supply on the vehicle base to deliver power to the vehicle pod according to the power rating.

14. The computer-implemented method of claim 10, wherein verifying that the vehicle base can safely transport the vehicle pod while the vehicle pod is detachably connected to the chassis on the vehicle base comprises:

determining whether the detachable connection of the vehicle pod to the chassis on the vehicle base meets a set of operational criteria, including evaluating at least one signal from the one or more sensing components on the vehicle base with respect to the set of operational criteria; and in response determining that the detachable connection of the vehicle pod to the chassis on the vehicle base does not meet the set of operational criteria, disabling an autonomous navigation capability of the vehicle base.

15. A vehicle base, comprising:

an engine or a motor configured to propel the vehicle base while a vehicle pod is detachably connected to the vehicle base; and a first computing system that includes one or more processors and one or more computer-readable media having instructions stored thereon that, when executed by the one or more processors, cause performance of operations comprising:

identifying, by the first computing system, that the vehicle pod is detachably connected, or is about to be detachably connected, to a chassis on the vehicle base;

in response to identifying that the vehicle pod is detachably connected, or is about to be detachably connected, to the chassis on the vehicle base, establishing a communications link between the first computing system and a second computing system installed in the vehicle pod;

determining, by the first computing system based on information obtained through the communications link, a configuration of the vehicle pod that is detachably connected, or is about to be detachably connected, to the chassis on the vehicle base; and verifying, by the first computing system, that the vehicle base can safely transport the vehicle pod while the vehicle pod is detachably connected to the chassis on the vehicle base.

16. The vehicle base of claim 15, wherein:

the vehicle pod comprises a housing that defines a human-occupiable space, the vehicle base is not configured to be human-occupiable, and the vehicle base is configured to autonomously navigate without the vehicle pod being detachably connected to the vehicle base.

17. The vehicle base of claim 15, wherein the operations further comprise:

identifying a set of vehicle pod parameters that correspond to the identified configuration of the vehicle pod that is detachably connected, or is about to be detachably connected, to the chassis on the vehicle base; and adjusting, by the first computing system based on the identified set of vehicle pod parameters that correspond to the identified configuration of the vehicle pod, a set of vehicle base parameters that define operational characteristics of the vehicle base.

18. The vehicle base of claim 17, wherein:
the set of vehicle pod parameters includes at least one of a size of the vehicle pod or a power rating of the vehicle pod; and adjusting the set of vehicle base parameters respectively includes at least one of adjusting a size of the chassis to match the size of the vehicle pod or configuring a power supply on the vehicle base to deliver power to the vehicle pod according to the power rating.

19. The vehicle base of claim 15, wherein verifying that the vehicle base can safely transport the vehicle pod while the vehicle pod is detachably connected to the chassis on the vehicle base comprises:

determining whether the detachable connection of the vehicle pod to the chassis on the vehicle base meets a set of operational criteria, including evaluating at least one signal from the one or more sensing components on the vehicle base with respect to the set of operational criteria; and in response determining that the detachable connection of the vehicle pod to the chassis on the vehicle base does not meet the set of operational criteria, disabling an autonomous navigation capability of the vehicle base.

* * * * *